Feb. 9, 1971     J. F. WAHL     3,561,116

TRANSMISSION MEMBERS FOR ELECTRIC HAIR CLIPPER

Filed Oct. 15, 1969

INVENTOR
John F. Wahl
By Pangley, Clayton, William
Dithmar & Vogel
Attys

United States Patent Office 3,561,116
Patented Feb. 9, 1971

3,561,116
TRANSMISSION MEMBERS FOR ELECTRIC HAIR CLIPPER
John F. Wahl, Sterling, Ill., assignor to Wahl Clipper Corporation, Sterling, Ill., a corporation of Illinois
Filed Oct. 15, 1969, Ser. No. 866,499
Int. Cl. B26b 19/02
U.S. Cl. 30—220                5 Claims

ABSTRACT OF THE DISCLOSURE

The transmission mechanism in an electric hair clipper driven by a rotary motor includes two members located between the drive shaft and a reciprocating cutting blade which is detachable from the clipper. One member is a spring-biased follower member which is connected to the cutting blade and is driven directly or indirectly by a cam on the drive shaft, and the other is a guide member which has guide surfaces engaged by the follower member, the follower member being guided by the guide member for reciprocating straight line movement. The follower member and the guide member have first and second retaining means which cooperate with each other to hold the follower member in place when the cutting blade is detached from the clipper, thereby facilitating reassembly and preventing possible loss of parts. The guide member is resilient in the region of its retaining means so the latter may be displaced to permit intended removal of the follower member and replacement thereof.

BACKGROUND OF THE INVENTION

This invention relates to a transmission mechanism for an electric hair clipper driven by a rotary motor, and more particularly to members of the transmission mechanism which cooperate with each other to hold one of the members in place when the cutting blades which normally hold the member in place are detached from the clipper for sharpening, replacement, cleaning, or sanitizing. The members are constructed so that the held member readily may be removed and replaced if desired.

The closest prior art known to applicant is the transmission mechanism shown in U.S. Pat. No. 3,458,932 owned by applicant's assignee. Referring to said patent, the transmission mechanism there shown includes a follower member 25 and a guide member 40 engaged by the follower member, the follower member being guided in back and forth movement by the guide member.

The follower member shown in the aforesaid patent normally is held in place by means of clipper blades 13 and 14 which are detachable from the clipper for purposes of sharpening, replacement, cleaning, or sanitizing. When the blades are removed, follower member 25, which is urged in outward direction by blade tensioning springs 50, tends to become disassociated from the clipper along with the springs 50, thereby complicating reassembly of the blades with the clipper, as well as risking loss of the disassociated elements.

The present invention contemplates improvements in the follower member and the guide member of the transmission mechanism shown in the aforesaid patent, specifically, the improved follower member and guide member are provided with first and second retaining means which cooperate with each other to hold the follower member in place when the clipper blades are removed from the clipper and yet permit the follower member readily to be removed and replaced if desired.

SUMMARY OF THE INVENTION

The invention resides in the provision of a first retaining means on a spring-biased follower member of a transmission mechanism for an electric hair clipper and a second retaining means on a guide member of the mechanism, the first and second retaining means cooperating with each other to hold the follower member in place when the cutting blades are detached from the clipper. When the cutting blades are in operative position, the retaining means permit the application of tension to the cutting blade to insure proper cutting action. In the form of the invention shown, the first and second retaining means are a boss on a flexible and resilient part of one of the members and a wall of a recess in the other of the members, the boss being received in the recess. The boss is tapered on one surface to facilitate assembly of the two members, and displaceable to permit intentional separation of the members.

DESCRIPTION OF THE PREFERRED EMBODIMENT

The transmission mechanism which is improved by the present invention is illustrated and described in U.S. Pat. No. 3,458,932, and detailed description thereof is unnecessary here. Only so much of the mechanism will be described as is necessary for an understanding of the present improvement.

Figure 1:
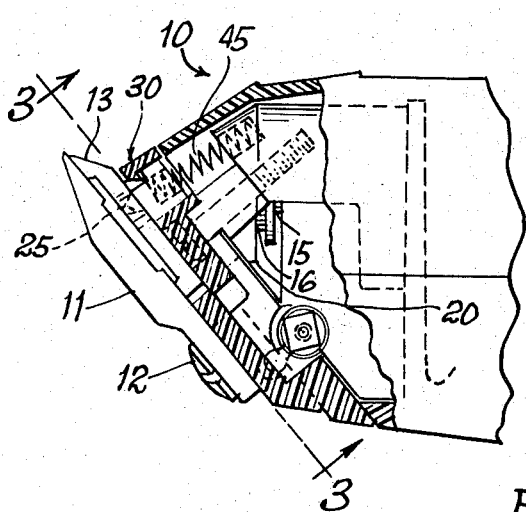
FIG. 1 is a fragmentary side elevational view, partly in section, of an electric hair clipper embodying the invention.
Figure 2:
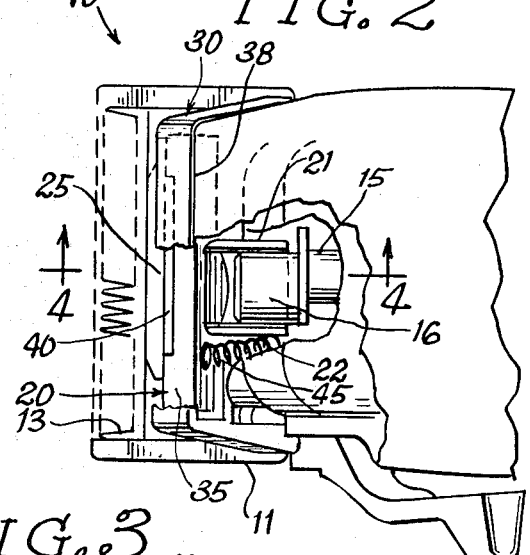
FIG. 2 is a fragmentary top plan view of the clipper, the housing partly broken away.

Referring to FIGS. 1 and 2, clipper 10 has a stationary comb blade 11 detachably secured in place by suitable means such as screw means 12 and a reciprocating cutting blade 13, both blades being conventional. Cutting blade 13 is held in place partly by comb blade 11, and when the latter is detached, cutting blade 13 also comes off.

Clipper 10 includes a rotary motor (not shown) having a drive shaft 15 to which is secured a cam 16, the latter being an eccentrically mounted cylinder.

A follower member 20 having spaced ears 21 and 22 (FIG. 2) which embrace cam 16 or an intermediate follower (not shown) is adapted to reciprocate on a straight line guided path and transmit reciprocating movement to cutting blade 13. As shown in all figures, follower member 20 has a transverse boss or finger 25 which is received within a matching recess in cutting blade 13 to connect member 20 with the blade. Thus, blade 13 reciprocates with follower member 20.

Figure 3:
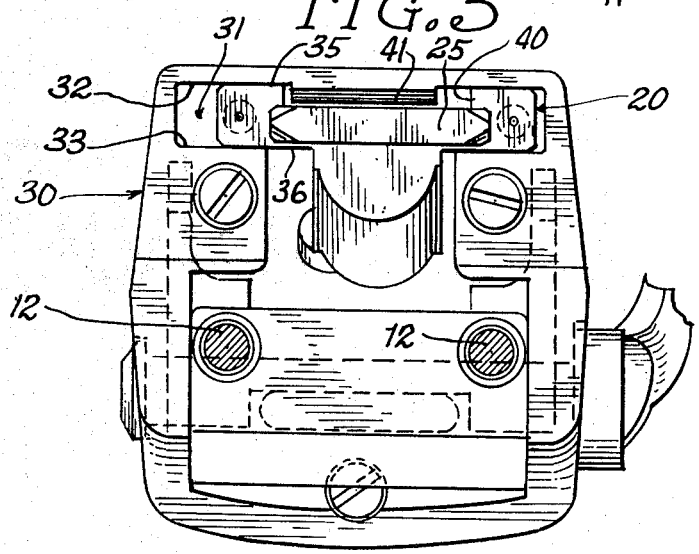
FIG. 3 is a bottom view of the forward end of the clipper substantially on line 3—3 of FIG. 1, the clipper blades omitted for clarity.

Follower member 20 is guided for straight line reciprocation by means of a guide member 30 which has a transversely extending rectangular slot 31 (FIG. 3). The transverse wall surfaces 32 and 33 of slot 31 constitute forward and rearward parallel guide surfaces, and these surfaces are engaged by forward and rearward parallel guided faces 35 and 36 (FIG. 3) of follower member 20. Wall surface 32 is part of wall 38 of guide member 30, the wall being flexible and resilient for a purpose to be mentioned later.

Follower member 20 is provided with a first retaining means and guide member 30 is provided with a second retaining means, the respective retaining means being shown as the upper wall 40a (FIG. 5) of a recess 40 in the forward guided face 35 of follower member 20 and a boss 41 on forward guide surface 32 of guide member 30. Recess 40 and boss 41 are well shown in bottom view in FIG. 3, the boss 41 in preferred form being of limited transverse length and centrally located on the transverse dimension of guide surface 32 of wall 38.

Figure 5:
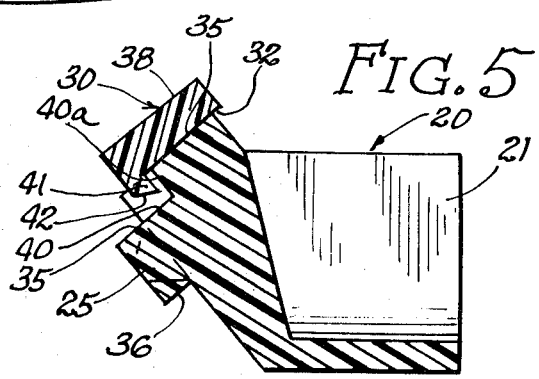
FIG. 5 is a fragmentary enlarged sectional view on line 4—4 of FIG. 2 through the transmission members, embodying the invention.

Referring to FIG. 5, upper wall 40a of recess 40 in follower member 20 overlies and is adapted to engage the upper surface of boss 41 of guide member 30, a relationship which prevents follower member 20 from becoming disassociated when blades 11 and 13 are removed from the clipper.

Figure 4:
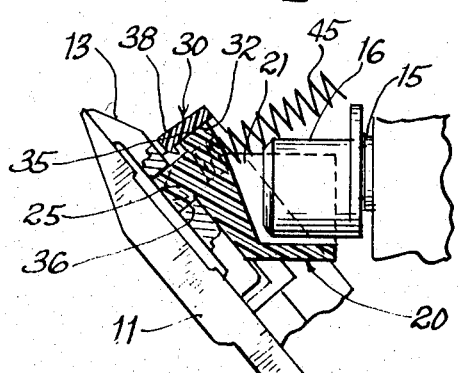
FIG. 4 is a fragmentary side elevational view, partly in section on line 4—4 of FIG. 2, the clipper housing omitted for clarity.

A pair of compression springs 45, one of which is shown in FIGS. 1, 2 and 4, extend between a fixed part of the clipper and follower member 20. The force exerted by springs 45 is communicated by the follower member to reciprocating cutting blade 13, thereby providing cutting tension between teeth located at the forward margins of blades 11 and 13.

The relationship between recess 40 and boss 41 is such that follower member 20 has clearance (best shown in FIG. 5) with the upper surface of boss 41 when the blades are in operating position on the clipper so that force from springs 45 may be communicated to cutting blade 13. However, when the blades are removed, springs 45 urge follower member 20 into engagement with boss 41, and the latter prevents follower member 20 and the associated springs 45 from becoming disassembled. Thus, first and second retaining means 40 and 41 facilitate replacement of blades 11 and 13, and prevent possible loss of follower member 20 and springs 45 when the blades are detached from the clipper.

The lower surface of boss 41 is inclined upwardly from bottom to top, as best shown at 42 in FIG. 5. This inclined surface cooperates with the resilience of wall 38 of guide member 30 to facilitate assembly or replacement of follower member 20. Resilient wall 38 may be flexed manually to separate the first and second retaining means when it is desired to remove follower member 20.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. In an electric hair clipper transmission mechanism for driving a reciprocating cutting blade from a cam on a drive shaft, transmission members comprising:

a spring-biased follower member connected to said blade and driven directly or indirectly by said cam, said follower member having spaced parallel forward and rearward guided faces and a first retaining means, and a stationary guide member having forward and rearward guide surfaces engaged by the guided faces of said follower member and a second retaining means in effective relation with said first retaining means, said first and second retaining means spaced from each other when said cutting blade is in operative position and engaging each other to hold said follower member in place when said cutting blade is detached from the clipper, one of said retaining means being displaceable to permit intentional assembly and disassembly of said follower member.

2. The combination of claim 1 wherein said first and second retaining means are a boss on one of said members and a wall of a recess in the other of said members, said recess receiving said boss.

3. The combination of claim 2 wherein said boss is on said guide member and said recess is in said follower member.

4. The combination of claim 3 wherein said guide member has a flexible resilient forward wall, the inner surface of which constitutes said forward guide surface, said boss being located on said wall and constituting said displaceable retaining means, and said recess is in the forward guided face of said follower member.

5. The combniation of claim 4 wherein the lower surface of said boss is inclined outwardly from bottom to top to facilitate assembly of said follower member.

References Cited
UNITED STATES PATENTS

| | | | |
|---|---|---|---|
| 1,729,332 | 9/1929 | Dremel | 30—223 |
| 1,811,903 | 6/1931 | Van Bree | 30—220X |
| 2,098,180 | 11/1937 | Dilks | 30—221 |
| 3,279,062 | 10/1966 | Andis | 30—221X |
| 3,458,932 | 8/1969 | Fox | 30—220 |

THERON E. CONDON, Primary Examiner

J. C. PETERS, Assistant Examiner

U.S. Cl. X.R.

30—221